(12) United States Patent
Satou et al.

(10) Patent No.: US 9,895,956 B2
(45) Date of Patent: Feb. 20, 2018

(54) VEHICLE AIR CONDITIONING APPARATUS FOR LOW OUTSIDE AIR TEMPERATURE USE

(71) Applicant: SANDEN CORPORATION, Isesaki-shi (JP)

(72) Inventors: Hiroshi Satou, Isesaki (JP); Megumi Shigeta, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 504 days.

(21) Appl. No.: 14/406,128

(22) PCT Filed: Jun. 12, 2013

(86) PCT No.: PCT/JP2013/066189
§ 371 (c)(1),
(2) Date: Dec. 5, 2014

(87) PCT Pub. No.: WO2013/187433
PCT Pub. Date: Dec. 19, 2013

(65) Prior Publication Data
US 2015/0151609 A1 Jun. 4, 2015

(30) Foreign Application Priority Data
Jun. 13, 2012 (JP) .................................. 2012-134100

(51) Int. Cl.
*B60H 1/00* (2006.01)
*B60H 1/22* (2006.01)
(Continued)

(52) U.S. Cl.
CPC ....... *B60H 1/2215* (2013.01); *B60H 1/00921* (2013.01); *B60H 1/3204* (2013.01);
(Continued)

(58) Field of Classification Search
CPC B60H 1/2215; B60H 1/00921; B60H 1/3204; B60H 1/3223; F25B 5/02;
(Continued)

(56) References Cited

U.S. PATENT DOCUMENTS 5,598,887 A 2/1997 Ikeda et al.
5,641,016 A * 6/1997 Isaji .................. B60H 1/00007
165/43

(Continued)

FOREIGN PATENT DOCUMENTS

JP 7-108824 4/1995
JP 9-39550 2/1997
(Continued)

*Primary Examiner* — Ljiljana Ciric
(74) *Attorney, Agent, or Firm* — Cozen O'Connor

(57) ABSTRACT

A vehicle air conditioning apparatus including a heat released refrigerant expansion valve that decompresses the refrigerant discharged from the radiator during the heating operation and the first heating and dehumidifying operation; a gas-liquid separator that separates the refrigerant decompressed by the heat released refrigerant expansion valve into a gaseous refrigerant and a liquid refrigerant; and a bypass circuit that allows part of at least the gaseous refrigerant separated in the gas-liquid separator to flow into a section of the compressor through which the refrigerant being decompressed passes.

7 Claims, 12 Drawing Sheets

(51) Int. Cl.
  *F25B 5/02* (2006.01)
  *F25B 40/00* (2006.01)
  *F25B 40/02* (2006.01)
  *F25B 49/02* (2006.01)
  *B60H 1/32* (2006.01)
  *F25B 29/00* (2006.01)
  *F25B 30/02* (2006.01)

(52) U.S. Cl.
  CPC ............ *B60H 1/3223* (2013.01); *F25B 5/02* (2013.01); *F25B 29/003* (2013.01); *F25B 30/02* (2013.01); *F25B 40/00* (2013.01); *F25B 40/02* (2013.01); *F25B 49/022* (2013.01); *F25B 2339/047* (2013.01); *F25B 2341/0662* (2013.01); *F25B 2400/0403* (2013.01); *F25B 2400/0409* (2013.01); *F25B 2400/0411* (2013.01); *F25B 2400/0417* (2013.01); *F25B 2400/13* (2013.01); *F25B 2400/23* (2013.01); *F25B 2600/021* (2013.01)

(58) Field of Classification Search
  CPC ........ F25B 29/003; F25B 30/02; F25B 40/02; F25B 49/022
  See application file for complete search history.

(56) References Cited

U.S. PATENT DOCUMENTS

| | | | |
|---|---|---|---|
| 5,704,219 A | 1/1998 | Suzuki et al. | |
| 5,996,360 A * | 12/1999 | Tanaka | B60H 1/00907 62/159 |
| 6,237,351 B1 * | 5/2001 | Itoh | B60H 1/00921 62/113 |
| 6,293,123 B1 * | 9/2001 | Iritani | B60H 1/3205 62/197 |
| 6,347,528 B1 | 2/2002 | Iritani et al. | |
| 2004/0060316 A1 * | 4/2004 | Ito | B60H 1/00328 62/324.1 |
| 2004/0074246 A1 * | 4/2004 | Kurata | B60H 1/00328 62/196.4 |
| 2004/0079096 A1 * | 4/2004 | Itoh | B60H 1/00735 62/223 |
| 2006/0005557 A1 * | 1/2006 | Takano | B60H 1/00878 62/238.6 |
| 2008/0041071 A1 * | 2/2008 | Itoh | B60H 1/00342 62/79 |
| 2010/0326127 A1 * | 12/2010 | Oomura | B60H 1/00785 62/498 |
| 2011/0016896 A1 * | 1/2011 | Oomura | B60H 1/00785 62/155 |
| 2011/0048671 A1 * | 3/2011 | Nishikawa | B60H 1/00885 165/42 |
| 2012/0060551 A1 * | 3/2012 | Takayama | F25B 29/00 62/513 |
| 2012/0266624 A1 * | 10/2012 | Inaba | B60H 1/00899 62/324.6 |
| 2013/0312447 A1 * | 11/2013 | Inaba | F25B 43/00 62/324.6 |
| 2014/0041826 A1 * | 2/2014 | Takeuchi | B60L 1/02 165/10 |
| 2014/0102666 A1 * | 4/2014 | Ichishi | B60H 1/00828 165/11.1 |
| 2014/0223943 A1 * | 8/2014 | Ichishi | B60H 1/3205 62/215 |
| 2014/0238067 A1 * | 8/2014 | Itou | F25B 41/04 62/324.6 |
| 2015/0107290 A1 * | 4/2015 | Hatomura | F25B 13/00 62/324.6 |
| 2015/0253045 A1 * | 9/2015 | Yamada | F25B 5/04 62/324.1 |
| 2015/0260439 A1 * | 9/2015 | Ohta | F25B 5/00 62/196.1 |
| 2015/0300706 A1 * | 10/2015 | Awa | F25B 29/003 62/324.6 |
| 2016/0068047 A1 * | 3/2016 | Kobayashi | F25B 5/04 62/401 |
| 2016/0280041 A1 * | 9/2016 | Suzuki | B60H 1/00921 |
| 2016/0297283 A1 * | 10/2016 | Sakamoto | F25B 49/02 |
| 2017/0151856 A1 * | 6/2017 | Kuwahara | B60H 1/00921 |

FOREIGN PATENT DOCUMENTS

| | | |
|---|---|---|
| JP | 2000-25446 | 1/2000 |
| JP | 2001-30744 | 2/2001 |
| JP | 2012-20599 | 2/2012 |
| JP | 2012-181005 | 9/2012 |

* cited by examiner

VEHICLE AIR CONDITIONING APPARATUS FOR LOW OUTSIDE AIR TEMPERATURE USE

RELATED APPLICATIONS

This is a U.S. National Phase Application under 35 USC 371 of International Application PCT/JP2013/066189 filed on Jun. 12, 2013.

This application claims the priority of Japanese application no. 2012-134100 filed Jun. 13, 2012, the entire content of which is hereby incorporated by reference.

TECHNICAL FIELD

The present invention relates to a vehicle air conditioning apparatus applicable to, for example, electric cars.

BACKGROUND ART

Conventionally, there has been known a vehicle air conditioning apparatus including: a compressor that compress a refrigerant and discharges the compressed refrigerant; a radiator that releases heat from the refrigerant; a heat exchanger that absorbs the heat into the refrigerant; and an outdoor heat exchanger that releases the heat from or absorbs the heat into the refrigerant (see, for example, Patent Literature 1).

This vehicle air conditioning apparatus performs a heating operation by: allowing the refrigerant discharged from the compressor to flow into the radiator and release the heat in the radiator; allowing the refrigerant having passed through the radiator to flow into the outdoor heat exchanger via a first expansion valve and absorb the heat in the outdoor heat exchanger; and allowing the refrigerant having passed through the outdoor heat exchanger to be sucked into the compressor.

The vehicle air conditioning apparatus may perform a heating and dehumidifying operation by: allowing the refrigerant discharged from the compressor to flow into the radiator and release the heat in the radiator; allowing part of the refrigerant having passed through the radiator to flow into the outdoor heat exchanger via the first expansion valve and absorb the heat in the outdoor heat exchanger; allowing the remaining refrigerant to flow into the heat exchanger via a second expansion valve and absorb the heat in the heat exchanger; and allowing the refrigerant having passed through the outdoor heat exchanger and the heat exchanger to be sucked into the compressor.

CITATION LIST

Patent Literature

PTL1: Japanese Patent Application Laid-Open No. 2000-25446

SUMMARY OF INVENTION

Technical Problem

With the above-described vehicle air conditioning apparatus, when the heating operation or the heating and dehumidifying operation when the outside air temperature is low, it is difficult for the refrigerant passing through the outdoor heat exchanger to absorb the heat from the outside air, and therefore the amount of the heat absorption into the refrigerant in the outdoor heat exchanger is likely to be insufficient. In addition, with the vehicle air conditioning apparatus, if the compressor is operated while the amount of the heat absorption into the refrigerant in the outdoor heat exchanger is insufficient, the amount of the refrigerant circulating in the refrigerant circuit is reduced, and therefore the amount of the heat released from the refrigerant in the radiator is reduced. This may make it difficult to achieve a desired heating performance.

It is therefore an object of the present invention to provide a vehicle air conditioning apparatus that can prevent an amount of the refrigerant discharged from the compressor from reducing when the outside air temperature is low to achieve a desired heating performance during a heating operation, and also can dehumidify the vehicle interior without deteriorating the heating performance during a heating and dehumidifying operation.

Solution to Problem

In order to achieve the above-described object, the vehicle air conditioning apparatus according to the present invention includes: a compressor configured to compress and discharge a refrigerant; a radiator configured to release heat from the refrigerant; a heat exchanger configured to absorb the heat into the refrigerant; an outdoor heat exchanger configured to release the heat from or absorb the heat into the refrigerant; a first expansion valve configured to decompress the refrigerant flowing into the outdoor heat exchanger; a second expansion valve configured to decompress the refrigerant flowing into the heat exchanger; an accumulator configured to separate the refrigerant into a gas and a liquid and to allow the refrigerant to be sucked into the compressor, the accumulator being provided in a refrigerant flow passage to a suction side of the compressor into which the refrigerant is sucked; a heating refrigerant circuit configured to allow the refrigerant discharged from the compressor to flow into the radiator and release heat in the radiator, to allow the refrigerant having passed through the radiator to flow into the outdoor heat exchanger via the first expansion valve and absorb the heat in the outdoor heat exchanger, and to allow the refrigerant having passed through the outdoor heat exchanger to be sucked into the compressor via the accumulator; a heating and dehumidifying refrigerant circuit configured to allow the refrigerant discharged from the compressor to flow into the radiator and release the heat in the radiator, to allow part of the refrigerant having passed through the radiator to flow into the outdoor heat exchanger via the first expansion valve and absorb the heat in the outdoor heat exchanger, to allow a remaining refrigerant having passed through the radiator to flow into the heat exchanger via the second expansion valve and absorb the heat in the heat exchanger, and to allow the refrigerant having passed through the outdoor heat exchanger and the heat exchanger to be sucked into the compressor via the accumulator; a third expansion valve configured to decompress the refrigerant flowing out of the radiator in the heating refrigerant circuit and the heating and dehumidifying refrigerant circuit; a gas-liquid separator configured to separate the refrigerant decompressed by the third expansion valve into a gaseous refrigerant and a liquid refrigerant; and a bypass circuit configured to allow part of at least the gaseous refrigerant separated in the gas-liquid separator to flow into a section of the compressor through which the refrigerant being compressed passes.

By this means, part of at least the gaseous refrigerant separated by the gas-liquid separator flows into the section of the compressor through which the refrigerant being compressed passes. Consequently, it is possible to increase the amount of the refrigerant discharged from the compressor, and therefore to increase the amount of the heat released from the refrigerant in the radiator.

Effect of the Invention

With the present invention, it is possible to increase the amount of the heat released from the refrigerant in the radiator by increasing the amount of the refrigerant discharged from the compressor. Consequently, it is possible to improve the heating performance during the heating operation, and also possible to dehumidify the vehicle interior without deteriorating the heating performance during the heating and dehumidifying operation. Moreover, during the heating operation, and, during the heating and dehumidifying operation, the refrigerant is sucked into the compressor via the accumulator, and therefore it is possible to prevent the amount of the lubricating oil returned to the compressor from being insufficient even if the amount of the circulating refrigerant is reduced.

DESCRIPTION OF EMBODIMENTS

FIG. 1 to FIG. 6 are schematic views showing the vehicle air conditioning apparatus according to Embodiment 1 of the present invention.

Figure 1:
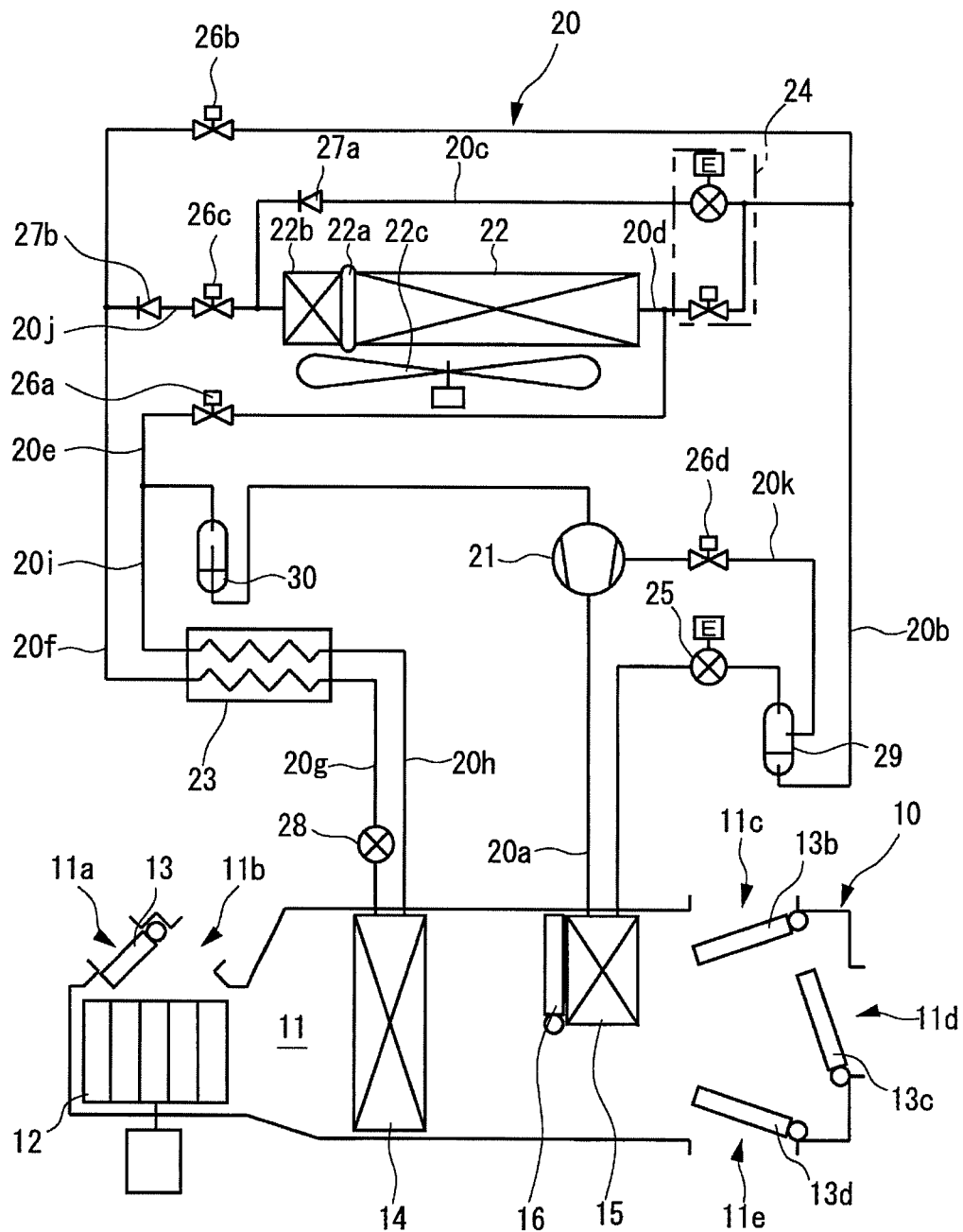
FIG. 1 is a schematic view showing a vehicle air conditioning apparatus according to Embodiment 1 of the present invention.

As shown in FIG. 1, the vehicle air conditioning apparatus according to the present invention includes an air conditioning unit 10 provided in the vehicle interior, and a refrigerant circuit 20 formed across the vehicle interior and the outdoor.

The air conditioning unit 10 includes an air flow passage 11 that allows the air to be supplied to the vehicle interior to pass through. An outside air inlet 11a and an indoor air inlet 11b are provided in the first end side of the air flow passage 11. The outside air inlet 11a is configured to allow the outside air to flow into the air flow passage 11, and the indoor air inlet 11b is configured to allow the indoor air to flow into the air flow passage 11. Meanwhile, a foot outlet 11c, a vent outlet and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11.

Also, in the first end side of the air flow passage 11, an inlet switching damper 13 configured to open one of the outside air inlet 11a and the indoor air inlet 11b and to close the other. When the inlet switching damper 13 closes the indoor air inlet 11b and opens the outside air inlet 11a, the mode is switched to an outside air supply mode in which the air flows from the outside air inlet 11a into the air flow passage 11. Meanwhile, when the inlet switching damper 13 closes the outside air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outside air inlet 11a and the indoor air inlet 11b and the outside air inlet 11a and the indoor air inlet 11b open, the mode is switched to a two-way mode in which the air flows from both the outside air inlet 11a and the indoor air inlet 11b into the air flow passage 11 according to the opening ratio of the outside air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown). Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode."

Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing therethrough and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. When the air mix damper 16 is moved to close the radiator 15 from the upstream side of the air flow passage 11, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outside air; an internal heat exchanger 23 configured to perform a heat exchange between the refrigerant discharged from the radiator 15 and the outdoor heat exchanger 22, at least the radiator 15, and the refrigerant discharged from the heat exchanger 14; a control valve 24 that has an expansion part as a first expansion valve and a condensing pressure regulating part and that can switch the refrigerant flow channel of the control valve 24 between the expansion part side and the condensing pressure regulating part side; a heat released refrigerant expansion valve 25, as a third expansion valve, for decompressing the refrigerant discharged from the radiator 15; first to forth solenoid valves 26a, 26b, 26c and 26d (26a to 26d); first and second check valves 27a and 27b; a heat exchanger expansion valve 28, as a second expansion valve, for decompressing the refrigerant flowing into the heat exchanger 14; a gas-liquid separator 29 that separates the refrigerant decompressed by the heat released refrigerant expansion valve 25 into a gas and a liquid; and an accumulator 30 that separates the gaseous refrigerant from the liquid refrigerant and allows the gaseous refrigerant to be sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged, thereby to form a refrigerant flow passage 20a. In addition, the input side of the first control valve 24 into which the refrigerant flows is connected to the output side of the radiator 15 from which the refrigerant is discharged, thereby to form a refrigerant flow passage 20b. In the refrigerant flow passage 20b, the heat released refrigerant expansion valve 25 and the gas-liquid separator 29 are provided in the order from the upstream side of the refrigerant flow direction. The first end of the outdoor heat exchanger 22 is connected to the output side of the control valve 24 from which the refrigerant is discharged, thereby to form a refrigerant flow passage 20c. A first check valve 27a is provided in the refrigerant flow passage 20c. In addition, the second end of the outdoor heat exchanger 22 is connected to the output side of the condensing pressure regulating part of the control valve 24 from which the refrigerant is discharged, thereby to form a refrigerant flow passage 20d. The suction side of the compressor 21 into which the refrigerant is sucked is connected to the second end of the outdoor heat exchanger 22 in parallel to the refrigerant flow passage 20d, thereby to form a refrigerant flow passage 20e. In the refrigerant flow passage 20e, a first solenoid valve 26a and the accumulator 30 are provided in the order from the upstream side of the refrigerant flow direction. The input side of the internal heat exchanger 23 into which a high-pressure refrigerant flows is connected to the refrigerant flow passage 20b, thereby to form a refrigerant flow passage 20f. A second solenoid valve 26b is provided in the refrigerant flow passage 20f. The input side of the heat exchanger 14 into which the refrigerant flows is connected to the output side of the internal heat exchanger 23 from which the high-pressure refrigerant is discharged, thereby to form a refrigerant flow passage 20g. The heat exchanger expansion valve 28 is provided in the refrigerant flow passage 20g. The input side of the internal heat exchanger 23 into which a low-pressure refrigerant flows is connected to the output side of the heat exchanger 14 from which the refrigerant is discharged, thereby to form a refrigerant flow passage 20h. The section of the refrigerant flow passage 20e between the first solenoid valve 26a and the accumulator 30 is connected to the output side of the internal heat exchanger 23 from which the low-pressure refrigerant is discharged, thereby to form a refrigerant flow passage 20i. The refrigerant flow passage 20f downstream from the second solenoid valve 26b in the refrigerant flow direction is connected to the first end of the outdoor heat exchanger 22 in parallel to the refrigerant flow passage 20c, so that a refrigerant flow passage 20j is formed. In the refrigerant flow passage 20j, a third solenoid valve 26c and a second check valve 27b are provided in the order from the upstream side of the refrigerant flow direction. The suction side of the compressor 21 into which the refrigerant is sucked is connected to the gas-liquid separator 29, so that the refrigerant flow passage 20k as a bypass circuit is formed. A fourth solenoid valve 26d is provided in the refrigerant flow passage 20k.

The compressor 21 and the outdoor heat exchanger 22 are disposed in an engine room outside the vehicle interior.

The compressor 21 has a refrigerant suction port to which the refrigerant flow passage 20e is connected, and a refrigerant inlet to which the refrigerant flow passage 20k is connected. The refrigerant inlet communicates with the section of the compressor 21 through which the refrigerant being compressed passes. The compressor 21 is driven by an electric motor and rotates at the number of revolutions that can be controlled by an inverter.

The outdoor heat exchanger 22 is a heat exchanger that is constituted by fins and tubes and is configured to perform a heat exchange between the refrigerant flowing through the outdoor heat exchanger 22 and the air outside the vehicle interior. When the outdoor heat exchanger 22 functions as a heat exchanger, the refrigerant flows into the outdoor heat exchanger 22 from the first end of the refrigerant flow passage of the outdoor heat exchanger 22. Meanwhile, when the outdoor heat exchanger 22 functions as a radiator, the refrigerant flows into the outdoor heat exchanger 22 from the second end of the refrigerant flow passage of the outdoor heat exchanger 22. A gas-liquid separating part 22*a* and a supercooling part 22*b* are provided in the first end side of the refrigerant flow passage of the outdoor heat exchanger 22. The gas-liquid separating part 22*a* can accumulate liquid refrigerant when the outdoor heat exchanger 22 functions as a radiator. The supercooling part 22*b* supercools the liquid refrigerant flowing out of the gas-liquid separating part 22*a*. In addition, the outdoor heat exchanger 22 includes an outdoor fan 22*c* that performs a heat exchange between the air outside the vehicle interior and the refrigerant while the vehicle stops.

The internal heat exchanger 23 is, for example, a double-pipe heat exchanger or a stacked heat exchanger, and is configured to perform a heat exchange between the refrigerants with one another.

The expansion part of the control valve 24 decompresses the refrigerant flowing into the outdoor heat exchanger 22 during the heating operation, and during the first heating and dehumidifying operation. Meanwhile, the condensing pressure regulating part of the control valve 24 regulates the condensing pressure of the refrigerant in the radiator 15 during the cooling and dehumidifying operation. The control valve 24 includes a stepping motor that switches the refrigerant flow channel of the control valve 24 between the expansion part side and the condensing pressure regulating part side, and controls the opening of each of the refrigerant flow channel to the expansion part and the refrigerant flow channel to the condensing pressure regulating part.

The heat exchanger expansion valve 28 is a temperature expansion valve having the adjustable opening according to the temperature of the refrigerant flowing out of the heat exchanger 14. As a temperature expansion valve, for example, a box type temperature valve including a refrigerant outlet channel that allows the refrigerant flowing out of the heat exchanger to flow through, a temperature-sensitive rod that detects the temperature of the refrigerant flowing out of the refrigerant outlet channel, and a diaphragm to move the valve element, which are integrally formed.

The gas-liquid separator 29 can accumulate the refrigerant therein, receives the refrigerant decompressed by the heat released refrigerant expansion valve 25, and separates the refrigerant into a gaseous refrigerant and a liquid refrigerant. The refrigerant flow passage 20*b* is connected to the lower part of the gas-liquid separator 29, and therefore it is possible to flow substantially liquid refrigerant into one of or both the outdoor heat exchanger 22 and the heat exchanger 14. Meanwhile, the refrigerant flow passage 20*k* is connected to the upper part of the gas-liquid separator 29, and therefore it is possible to flow a substantially gaseous refrigerant into the section of the compressor 21 through which the refrigerant being compressed passes.

The vehicle air conditioning apparatus having the above-described configuration performs cooling operation, cooling and dehumidifying operation, heating operation, first heating and dehumidifying operation, and second heating and dehumidifying operation. Hereinafter, each operation will be explained.

Figure 2:
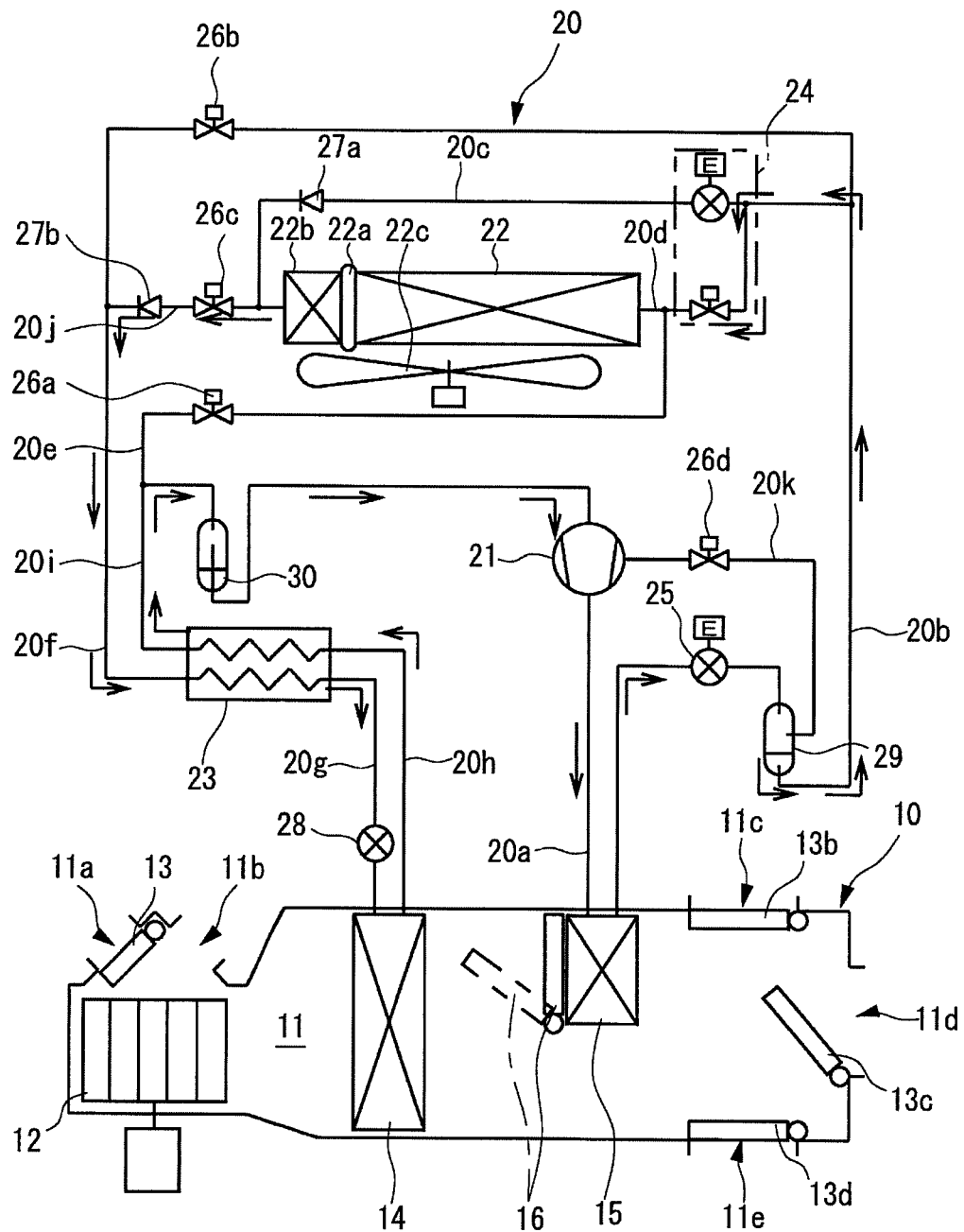
FIG. 2 is a schematic view showing the vehicle air conditioning apparatus performing a cooling operation and a cooling and dehumidifying operation.

During the cooling operation, and, during the cooling and dehumidifying operation, in the refrigerant circuit 20, the refrigerant flow channel of the control valve 24 is set to the condensing pressure regulating part; the third solenoid valve 26*c* is opened; the first, second, and fourth solenoid valves 26*a*, 26*b* and 26*d* are closed; and compressor 21 is operated. By this means, as shown in FIG. 2, the refrigerant discharged from the compressor 21 flows through the refrigerant circuit 20 in the following order: the refrigerant flow passage 20*a*; the radiator 15; the refrigerant flow passages 20*b* and 20*d*; the outdoor heat exchanger 22; the refrigerant flow passages 20*j* and 20*f*; the high-pressure side of the internal heat exchanger 23; the refrigerant flow passage 20*g*; the heat exchanger 14; the refrigerant flow passage 20*h*; the low-pressure side of the internal heat exchanger 23; the refrigerant flow passages 20*i* and 20*e*, and is sucked into the compressor 21. During the cooling operation, the refrigerant flowing through the refrigerant circuit 20 releases the heat in the outdoor heat exchanger 22 and absorbs the heat in the heat exchanger 14. Meanwhile, during the cooling and dehumidifying operation, when the air mix damper 16 is opened as shown by the dashed-dotted line of FIG. 2, the refrigerant flowing through the refrigerant circuit 20 releases the heat also in the radiator 15. The refrigerant flowing through the outdoor heat exchanger 22 is separated into a gaseous refrigerant and a liquid refrigerant in the gas-liquid separating part 22*a*, and the liquid refrigerant is supercooled in the supercooling part 22*b*. Therefore, the refrigerant flowing out of the outdoor heat exchanger 22 is supercooled liquid. During the cooling operation, and, during the cooling and dehumidifying operation, the temperature of the refrigerant flowing out of the heat exchanger 14 is adjusted to a predetermined degree of superheat by the control of the opening of the heat exchanger expansion valve 28. Therefore, all of the refrigerant flowing into the accumulator 30 is a gaseous refrigerant, and a liquid refrigerant does not remain in the accumulator 30 but is sucked into the compressor 21.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooling air becomes target air-blowing temperature TAO of the air to blow out of the outlets 11*c*, 11*d* and 11*e* to the vehicle interior in order to set the temperature of the vehicle interior to the target preset temperature Tset.

The target air-blowing temperature TAO is calculated based on the preset temperature Tset, and environmental conditions including the outside air temperature Tam, the indoor air temperature Tr, and an amount of insolation Ts.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 3:
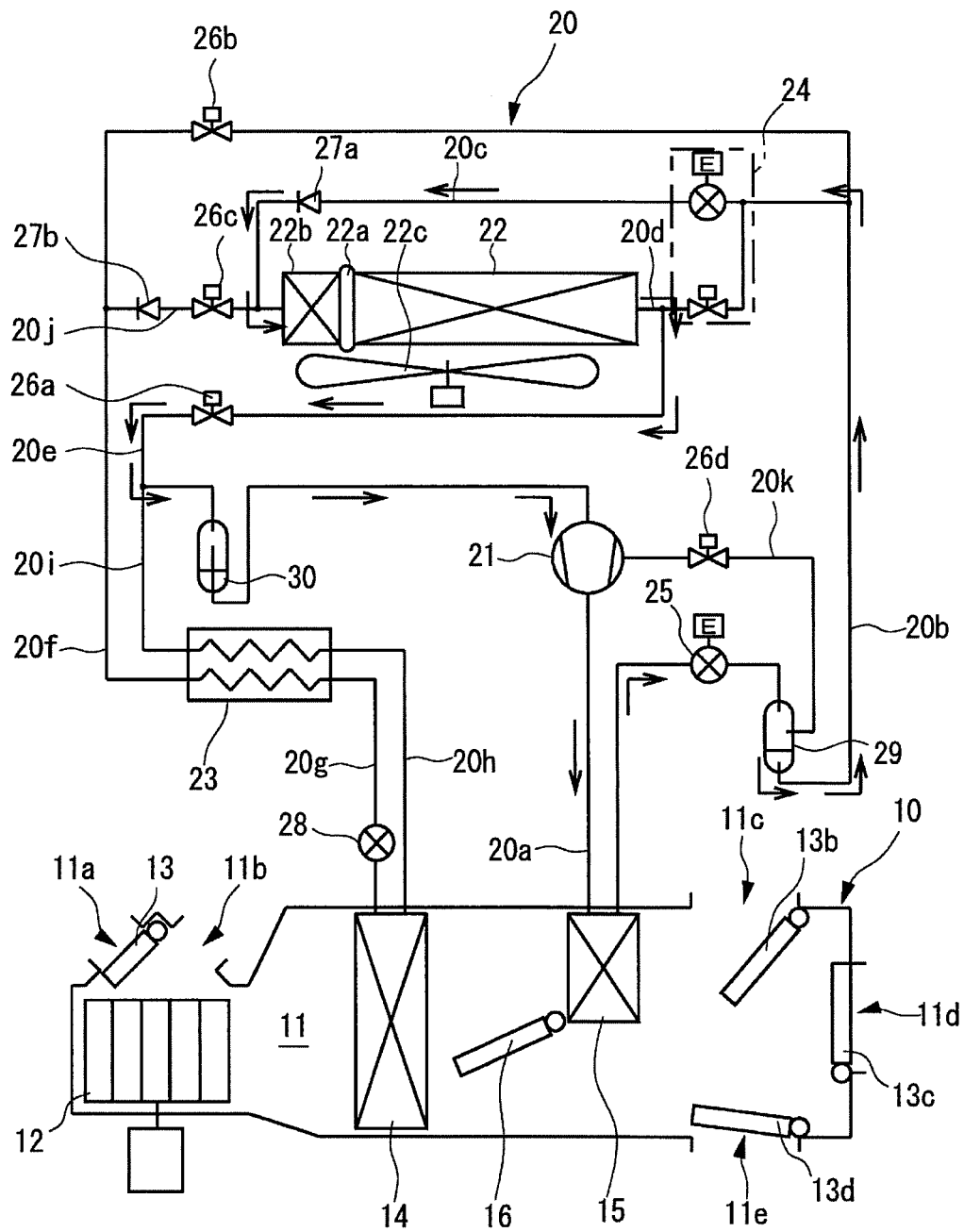
FIG. 3 is a schematic view showing the vehicle air conditioning apparatus performing a heating operation.

During the heating operation, in the refrigerant circuit 20, the refrigerant flow channel of the control valve 24 is set to the expansion part; the first solenoid valve 26a is opened; the second, third and fourth solenoid valves 26b, 26c and 26d are closed; and the compressor 21 is operated. By this means, as shown in FIG. 3, the refrigerant discharged from the compressor 21 flows through the refrigerant circuit 20 in the following order: the refrigerant flow passage 20a; the radiator 15; the refrigerant flow passages 20b and 20c; the outdoor heat exchanger 22; the refrigerant flow passages 20d and 20e, and is sucked into the compressor 21. The refrigerant flowing through the refrigerant circuit 20 releases the heat in the radiator 15 and absorbs the heat in the outdoor heat exchanger 22. During the heating operation, by controlling the opening of the heat released refrigerant expansion valve 25, the temperature of the refrigerant flowing through the radiator 15 is adjusted to a predetermined degree of supercooling. The refrigerant flowing out of the radiator 15 is decompressed by the heat released refrigerant expansion valve 25 and the expansion part of the control valve 24, and flows into the outdoor heat exchanger 22. The refrigerant flowing out of the outdoor heat exchanger 22 is separated into a gaseous refrigerant and a liquid refrigerant in the accumulator 30, and only the gaseous refrigerant is sucked into the compressor 21.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 4:
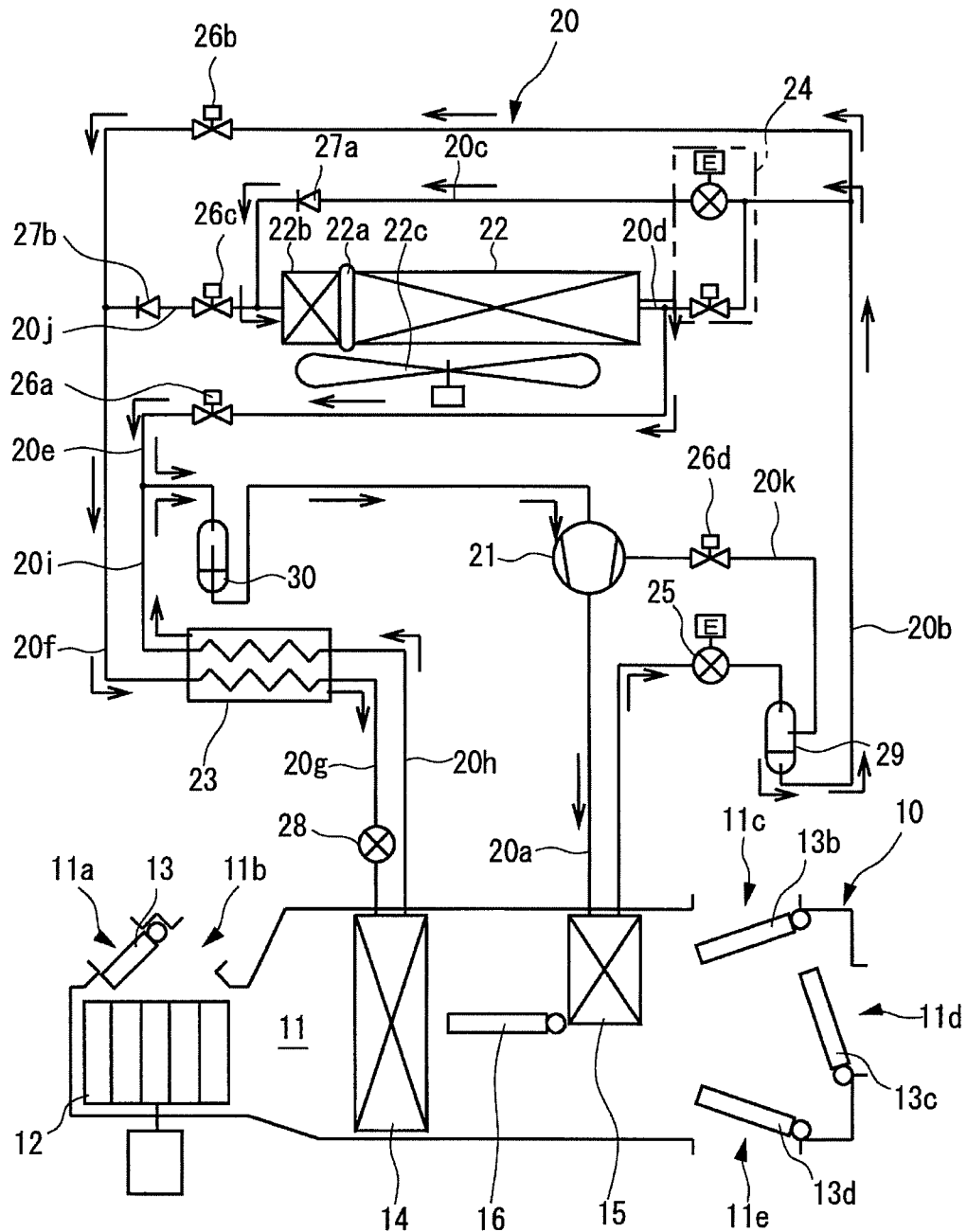
FIG. 4 is a schematic view showing the vehicle air conditioning apparatus performing a first heating and dehumidifying operation.

During the first heating and dehumidifying operation, in the refrigerant circuit 20, the refrigerant flow channel of the control valve 24 is set to the expansion part; the first and second solenoid valves 26a and 26b are opened; the third and fourth solenoid valves 26c and 26d are closed; and the compressor 21 is operated. By this means, as shown in FIG. 4, the refrigerant discharged from the compressor 21 flows through the refrigerant circuit 20 in the following order: the refrigerant flow passage 20a; the radiator 15; and the refrigerant flow passage 20b. Part of the refrigerant having passed through the refrigerant flow passage 20b flows through the refrigerant circuit 20 in the following order: the refrigerant flow passage 20c; the outdoor heat exchanger 22; and the refrigerant flow passage 20e, and is sucked into the compressor 21. Meanwhile, the remaining refrigerant having passed through the refrigerant flow passage 20b flows through the refrigerant circuit 20 in the following order: the refrigerant flow passage 20f; the high-pressure side of the internal heat exchanger 23; the refrigerant flow passage 20g; the heat exchanger 14, the refrigerant flow passage 20h; the low-pressure side of the internal heat exchanger 23; the refrigerant flow passages 20i and 20e, and is sucked into the compressor 21. The refrigerant flowing through the refrigerant circuit 20 releases the heat in the radiator 15 and absorbs the heat in the heat exchanger 14 and the outdoor heat exchanger 22. During the first heating and dehumidifying operation, by controlling the opening of the heat released refrigerant expansion valve 25, the temperature of the refrigerant flowing through the radiator 15 is adjusted to a predetermined degree of supercooling. Then, part of the refrigerant flowing out of the radiator 15 is decompressed by the heat released refrigerant expansion valve 25 and the expansion part of the control valve 24. Meanwhile, the remaining refrigerant is decompressed by the heat released refrigerant expansion valve 25 and the heat exchanger expansion valve 28 and flows into the heat exchanger 14. The refrigerant flowing out of the heat exchanger 14 and the outdoor heat exchanger 22 is separated into a liquid refrigerant and a gaseous refrigerant in the accumulator 30, and only the gaseous refrigerant is sucked into the compressor 21.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. At least part of the air having been dehumidified in the heat exchanger 14 is subjected to a heat exchange with the refrigerant in the radiator 15 and heated. As a result, the air at the target air-blowing temperature TAO blows into the vehicle interior.

Figure 5:
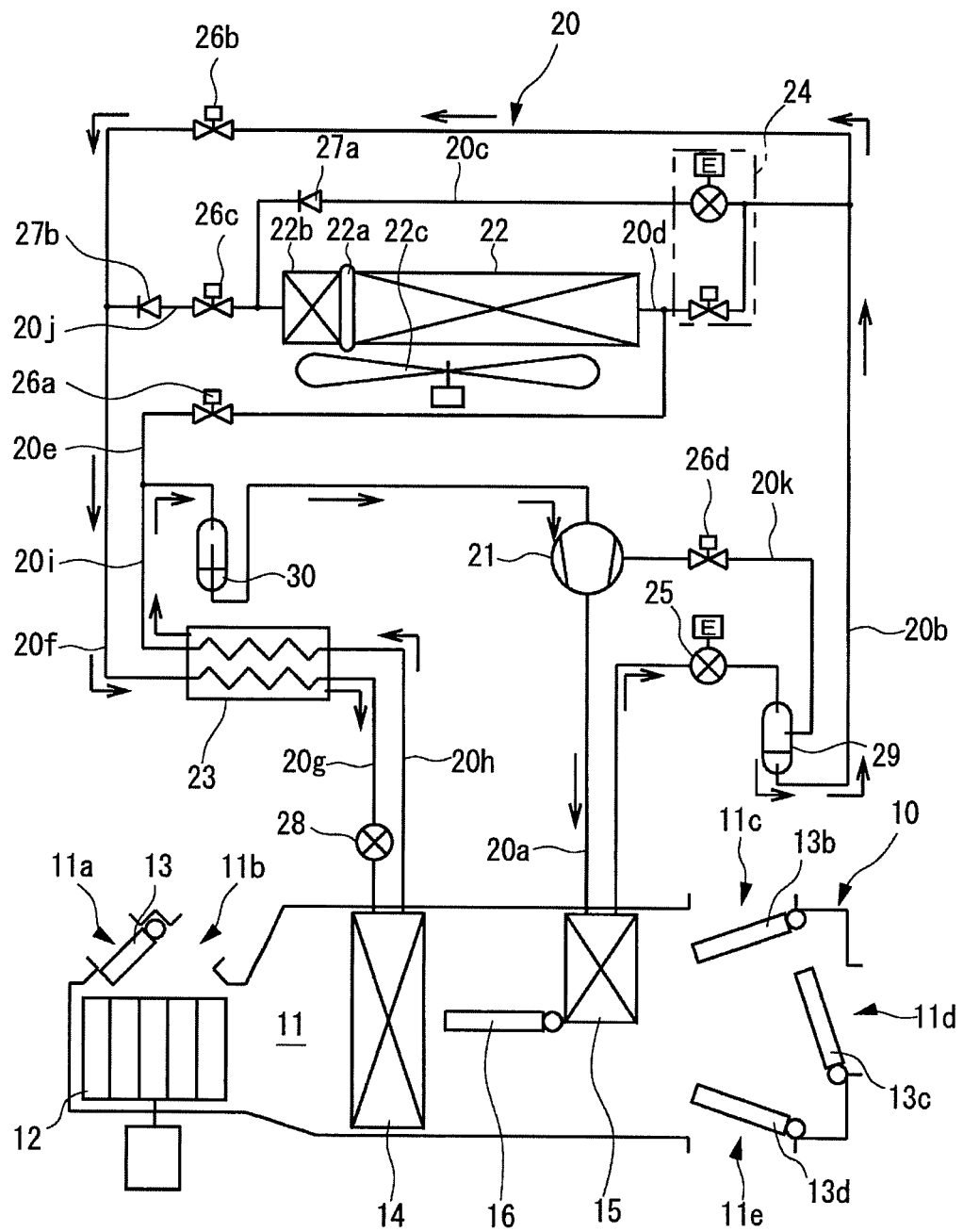
FIG. 5 is a schematic view showing the vehicle air conditioning apparatus performing a second heating and dehumidifying operation.

During the second heating and dehumidifying operation, in the refrigerant circuit 20, the refrigerant flow channel of the control valve 24 is closed; the second solenoid valve 26b is opened; the first, third and fourth solenoid valves 26a, 26c and 26d are closed; and the compressor 21 is operated. By this means, as shown in FIG. 5, the refrigerant discharged from the compressor 21 flows through the refrigerant circuit 20 in the following order: the refrigerant flow passage 20a; the radiator 15; the refrigerant flow passages 20b and 20f; the high-pressure side of the internal heat exchanger 23; the refrigerant flow passages 20g; the heat exchanger 14; the refrigerant flow passage 20h; the low-pressure side of the internal heat exchanger 23; and the refrigerant flow passages 20i and 20e, and is sucked into the compressor 21. The refrigerant flowing through the refrigerant circuit 20 releases the heat in the radiator 15 and absorbs the heat in the heat exchanger 14. During the second heating and dehumidifying operation, by controlling the opening of the heat released refrigerant expansion valve 25, the temperature of the refrigerant flowing through the heat exchanger 15 is adjusted to a predetermined degree of supercooling. In addition, the refrigerant flowing out of the radiator 15 is decompressed by the heat released refrigerant expansion valve 25 and the heat exchanger expansion valve 28, and flows into the heat exchanger 14. The refrigerant flowing out of the heat exchanger 14 is separated into a liquid refrigerant and a gaseous refrigerant in the accumulator 30, and only the gaseous refrigerant is sucked into the compressor 21.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the operation is switched among the cooling operation, the cooling and dehumidifying operation, the heating operation, the first heating and dehumidifying operation, and the second heating and dehumidifying operation, based on environmental conditions including the outside air temperature Tam, the indoor air temperature Tr, the outside air humidity, the indoor air humidity Th, the amount of insolation Ts and so forth.

In addition, the mode of the outlets 11c, 11d and 11e are switched by the outlet switching dampers 13b, 13c and 13d.

The opening of the air mix damper 16 is controlled such that the temperature of the air blowing out of the outlets 11c, 11d and 11e is the target air-blowing temperature TAO.

In each operation, switching the operating mode among the foot mode, the vent mode and the bi-level mode is performed according to the target air-blowing temperature TAO. To be more specific, when the target air-blowing temperature TAO is high, for example, 40 degrees Celsius, the mode is set to the foot mode. Meanwhile, when the target air-blowing temperature TAO is low, for example, lower than 25 degrees Celsius, the mode is set to the vent mode. Moreover, when the target air-blowing temperature TAO is the temperature between the temperature for the foot mode and the temperature for the vent mode, the mode is set to the bi-level mode.

When the outside air temperature is low during the heating operation or the first heating and dehumidifying operation, it makes it difficult to absorb the heat into the refrigerant flowing through the outdoor heat exchanger 22. During the heating operation or the first heating and dehumidifying operation, if the amount of the heat absorption into the refrigerant in the outdoor heat exchanger 22 is not sufficient, the amount of the refrigerant circulating in the refrigerant circuit 20 is reduced, and therefore the amount of the heat released from the refrigerant in the radiator 15 is reduced. As a result, the heating performance may deteriorate.

Therefore, when the outside air temperature is low during the heating operation or the first heating and dehumidifying operation, the fourth solenoid valve 26d is opened, in order to increase the amount of the heat released from the refrigerant in the radiator 15.

Figure 6:
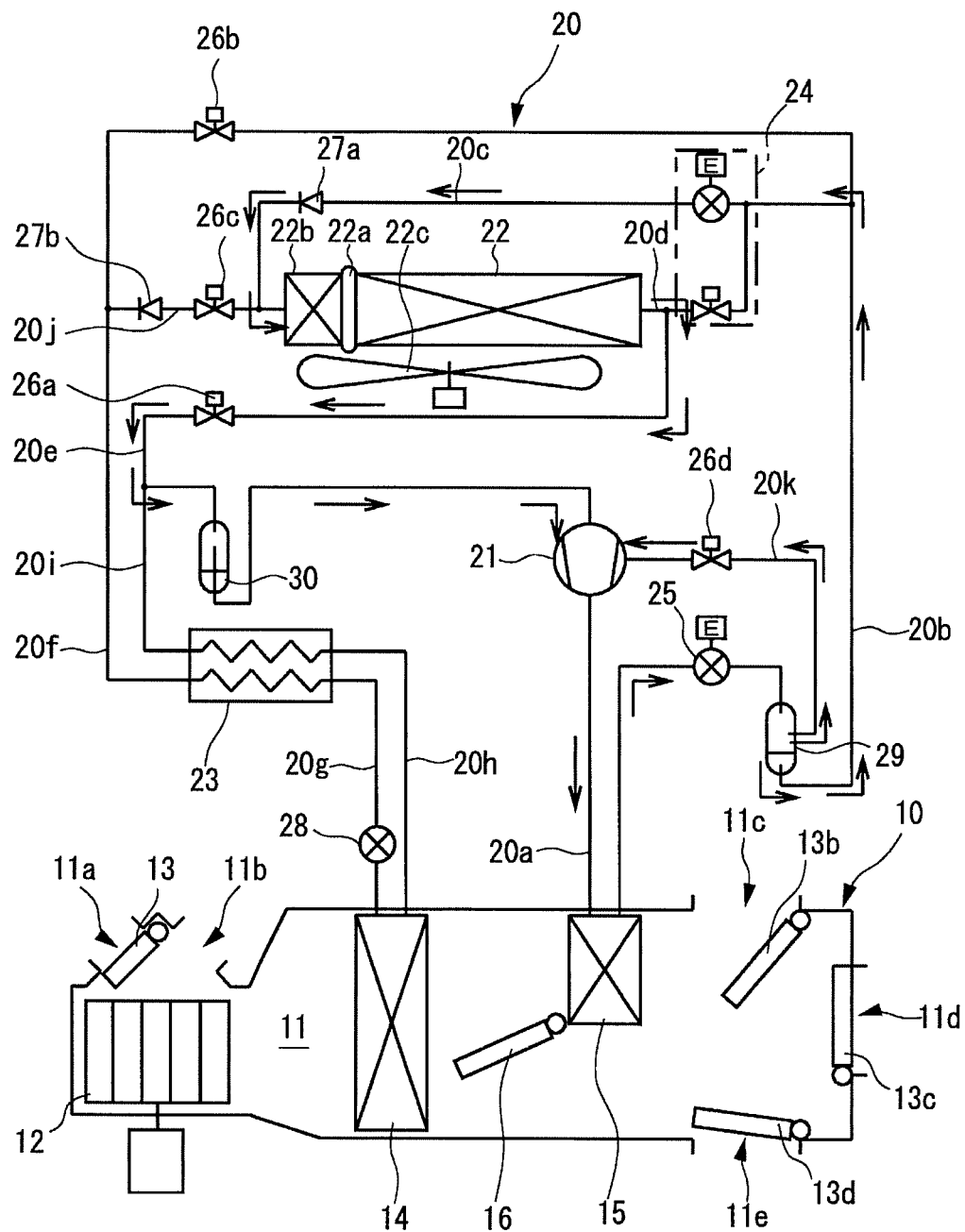
FIG. 6 is a schematic view showing the vehicle air conditioning apparatus with a fourth solenoid valve which is open during the heating operation.

When the fourth solenoid valve 26d is open during the heating operation or the first heating and dehumidifying operation, as shown in FIG. 6 (showing the heating operation), part of the refrigerant flowing into the gas-liquid separator 29 passes through the refrigerant flow passage 20k, and then flows into the section of the compressor 21 through which the refrigerant being compressed passes. In this case, the refrigerant flowing into the compressor 21 is a substantially gaseous refrigerant, which has flowed out of the upper part of the gas-liquid separator 29. However, a refrigerant in gas-liquid two-phase is likely to flow into the compressor 21 depending on the operating state. In addition, the amount of the refrigerant flowing into the compressor 21 via the refrigerant flow passage 20k is adjusted to a predetermined value by controlling the opening of the expansion part of the control valve 24.

By this means, the substantially gaseous refrigerant is flowed into the section of the compressor 21 through which the refrigerant being compressed passes. Therefore, even if the amount of the heat absorption into the refrigerant in the outdoor heat exchanger 22 is insufficient, and consequently the amount of the refrigerant circulating in the refrigerant circuit 20 is reduced, it is possible to increase the amount of the refrigerant discharged from the compressor 21. By increasing the amount of the refrigerant discharged from the compressor 21, it is possible to increase the amount of the heat released from the refrigerant in the radiator 15.

In addition, the refrigerant is sucked into the compressor 21 via the accumulator 30, and therefore it is possible to return the lubricating oil to the compressor 21, which is required to lubricate the compressor 21.

As described above, with the present embodiment, the vehicle air conditioning apparatus includes: the heat released refrigerant expansion valve 25 that decompresses the refrigerant flowing out of the radiator 15 during the heating operation and the first heating and dehumidifying operation; the gas-liquid separator 29 that separates the refrigerant decompressed by the heat released refrigerant expansion valve 25 into a gaseous refrigerant and a liquid refrigerant; and the refrigerant flow passage 20k, as a bypass circuit, which allows part of at least the gaseous refrigerant separated in the gas-liquid separator 29 to flow into the section of the compressor 21 through which the refrigerant being compressed passes. By this means, when the outside air temperature is low during the heating operation or the first heating and dehumidifying operation, it is possible to increase the amount of the heat released from the refrigerant in the radiator 15 by increasing the amount of the refrigerant discharged from the compressor 21. Therefore, it is possible to improve the heating performance during the heating operation, and also possible to dehumidify the vehicle interior without deteriorating the heating performance during the heating and dehumidifying operation. In addition, during the heating operation, and, during the heating and dehumidifying operation, the refrigerant is sucked into the compressor 21 via the accumulator 30, and therefore it is possible to prevent the amount of the lubricating oil returned to the compressor 21 from being insufficient even if the amount of the circulating refrigerant is reduced.

Moreover, during the heating operation, and, during the first heating and dehumidifying operation, the opening of the heat released refrigerant expansion valve 25 is controlled such that the degree of supercooling of the refrigerant in the radiator 15 is a predetermined value, and the opening of the expansion part of the control valve 24 is controlled such that the amount of the refrigerant flowing through the refrigerant flow passage 20k is a predetermined value. By this means, it is possible to secure a required amount of the heat released from the refrigerant in the radiator 15, and therefore to improve the control performance to realize a target temperature of the vehicle interior.

Figure 7:
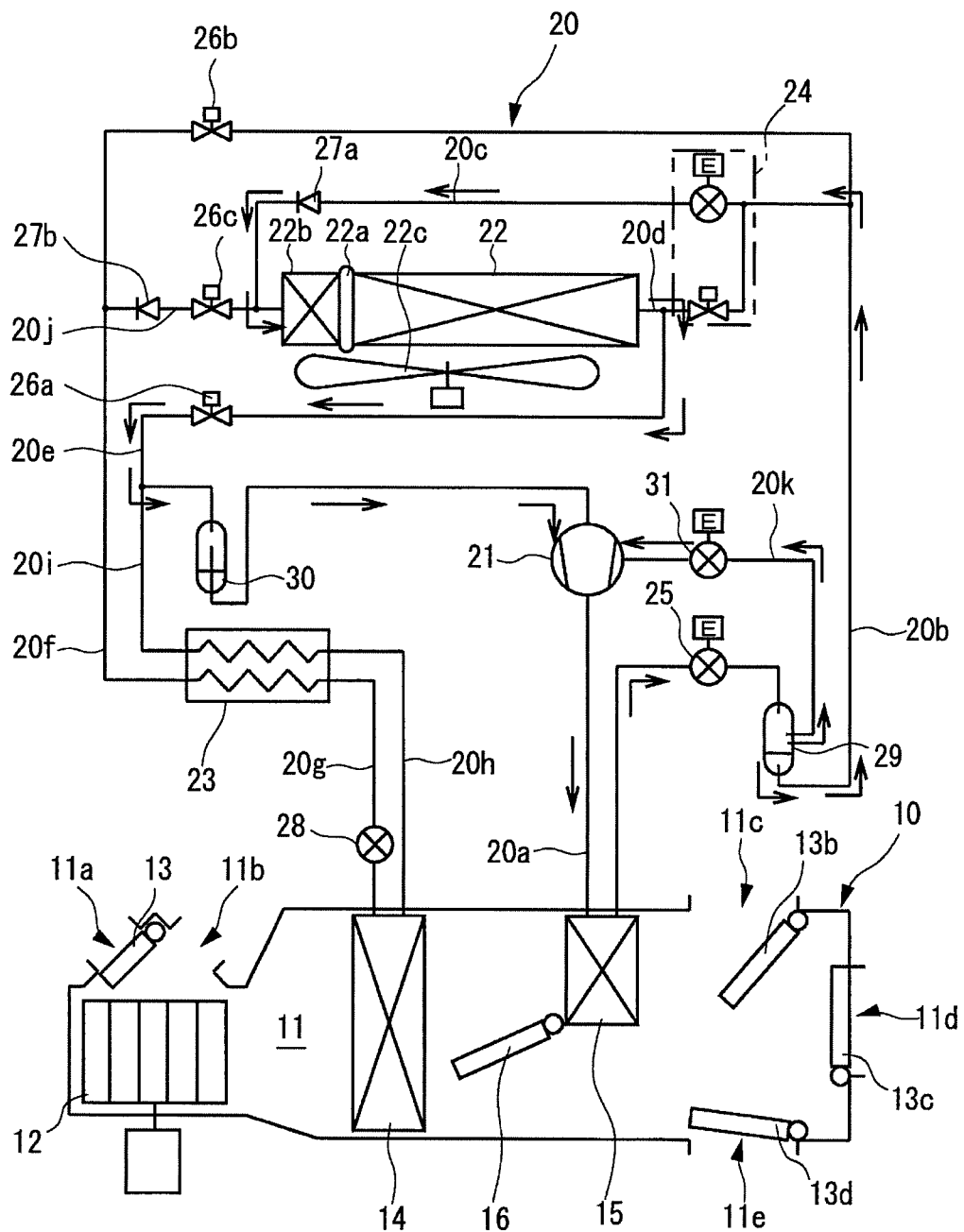
FIG. 7 is a schematic view showing the vehicle air conditioning apparatus according to Embodiment 2 of the present invention.

FIG. 7 shows a schematic view showing the vehicle air conditioning apparatus according to Embodiment 2 of the present invention. Here, the same components are assigned the same reference numerals as in the above-described embodiment.

As shown in FIG. 7, this vehicle air conditioning apparatus includes a bypass expansion valve 31 that is an electronic expansion valve with the adjustable opening provided in the refrigerant flow passage 20k, instead of the fourth solenoid valve 26d according to Embodiment 1.

With the vehicle air conditioning apparatus having the above-described configuration, when the outside air temperature is low during the heating operation or the first heating and dehumidifying operation, the bypass expansion valve 31 is opened in order to increase the amount of the heat released from the refrigerant in the radiator 15.

When the bypass expansion valve 31 is open during the heating operation or the first heating and dehumidifying operation, as shown in FIG. 7 (showing the heating operation), part of the refrigerant having passed through the gas-liquid separator 29 flows through the refrigerant flow passage 20k and flows into the section of the compressor 21 through which the refrigerant being compressed passes. In this case, the refrigerant flowing into the compressor 21 is a substantially gaseous refrigerant, which has flowed out of the upper part of the gas-liquid separator 29. However, a refrigerant in gas-liquid two-phase is likely to flow into the compressor 21 depending on the operating state. In addition, the amount of the refrigerant flowing into the compressor 21 via the refrigerant flow passage 20k is adjusted to a predetermined value by controlling the opening of the bypass expansion valve 31 while the opening of the expansion part of the control valve 24 is fixed.

By this means, it is possible to flow the substantially gaseous refrigerant into the section of the compressor 21 through which the refrigerant being compressed passes. Therefore, it is possible to increase the amount of the refrigerant discharged from the compressor 21 even if the amount of the heat absorption into the refrigerant in the outdoor heat exchanger 22 is not sufficient, and consequently the amount of the refrigerant circulating in the refrigerant circuit 20 is reduced.

By increasing the amount of the refrigerant discharged from the compressor 21, it is possible to increase the amount of the heat released from the refrigerant in the radiator 15.

In addition, the refrigerant is sucked into the compressor 21 via the accumulator 30, and therefore it is possible to return the lubricating oil to the compressor 21, which is required to lubricate the compressor 21.

As described above, with the vehicle air conditioning apparatus according to the present embodiment, when the outside air temperature is low during the heating operation or the first heating and dehumidifying operation, it is possible to increase the amount of the heat released from the refrigerant in the radiator 15 by increasing the amount of the refrigerant discharged from the compressor 21, in the same way as in the above-described embodiment. Therefore, it is possible to improve the heating performance during the heating operation, and also possible to dehumidify the vehicle interior without deteriorating the heating performance during the heating and dehumidifying operation. In addition, during the heating operation, and, during the heating and dehumidifying operation, the refrigerant is sucked into the compressor 21 via the accumulator 30, and therefore it is possible to prevent an amount of the lubricating oil returned to the compressor 21 from being insufficient even if the amount of the circulating refrigerant is reduced.

Moreover, during the heating operation, and, during the first heating and dehumidifying operation, the opening of the heat released refrigerant expansion valve 25 is controlled such that the degree of supercooling of the refrigerant in the radiator 15 is a predetermined value, and also the opening of the bypass expansion valve 31 is controlled such that the amount of the refrigerant flowing through the refrigerant flow passage 20$k$ is a predetermined value. By this means, it is possible to secure a required amount of the heat released from the refrigerant in the radiator 15, and therefore to improve the control performance to realize a target temperature of the vehicle interior.

Figure 8:
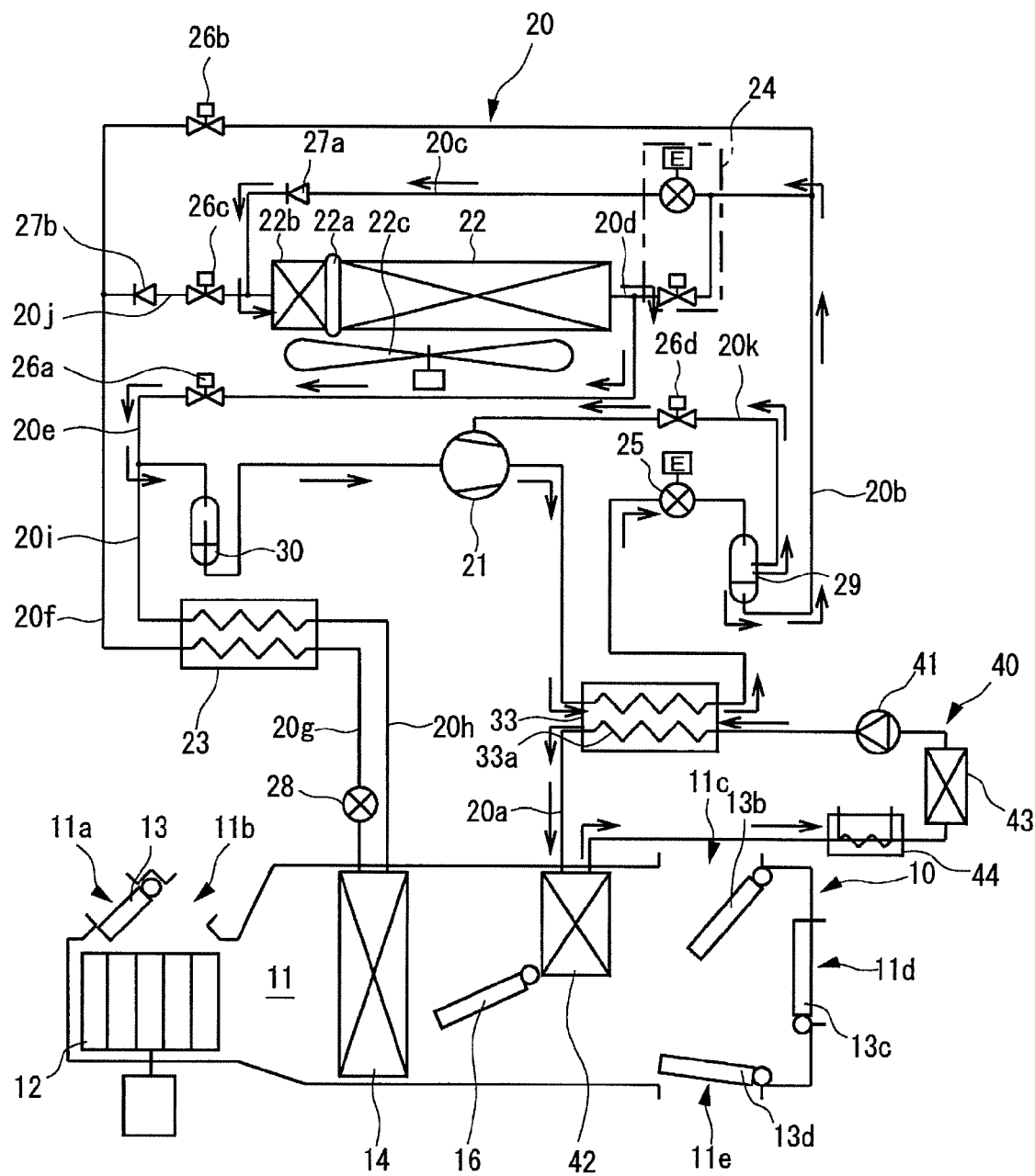
FIG. 8 is a schematic view showing the vehicle air conditioning apparatus according to Embodiment 3 of the present invention.

FIG. 8 is a schematic view showing the vehicle air conditioning apparatus according to Embodiment 3 of the present invention. Here, the same components are assigned the same reference numerals as in the above-described embodiments.

As shown in FIG. 8, this vehicle air conditioning apparatus includes a refrigerant radiator 33 provided outside the air flow passage 11 and configured as a radiator to perform a heat exchange between water as a heat medium and the refrigerant, instead of the radiator 15 according to Embodiment 1.

A water circuit 40, as a heat medium circuit, which allows water to pass through is connected to a heat exchange part 33$a$ of the refrigerant radiator 33 configured to perform a heat exchange between the water and the refrigerant. A water pump 41 configured to discharge water; a heater core 42 as a heat medium radiator configured to perform a heat exchange between the air flowing through the air flow passage 11 and the water; an engine radiator 43 as an exhaust heat absorbing part configured to absorb the exhaust heat from the engine that moves the vehicle into the water; and an electric heater 44 configured to heat the water, are connected to the water circuit 40.

With the vehicle air conditioning apparatus having the above-described configuration, it is possible to flow the refrigerant through the refrigerant circuit 20 in the same way as in Embodiment 1, and also possible to flow the substantially gaseous phase refrigerant in the gas-liquid separator 29 into the compressor 21 via the refrigerant flow passage 20$k$.

During the cooling and dehumidifying operation, during the heating operation, during the first heating and dehumidifying operation, and during the second heating and dehumidifying operation, the water pump 41 is driven to flow the water through the water circuit 40.

The water flowing through the water circuit 40 absorbs the heat from the refrigerant in the refrigerant radiator 33, and, in the heater core 42, is subjected to a heat exchange with the air flowing through the air flow passage 11 and releases the heat. The water flowing through the water circuit 40 is heated in the refrigerant radiator 33, as well as heated by the exhaust heat from engine in the engine radiator 43. In addition, when the amount of the heating of the air flowing through the air flow passage 11 is not sufficient, the water flowing through the water circuit 40 is heated by using the electric heater 44, and therefore it is possible to compensate for an insufficient amount of the heating.

As described above, with the vehicle air conditioning apparatus according to the present embodiment, when the outside air temperature is low during the heating operation or the first heating and dehumidifying operation, it is possible to increase the amount of the heat released from the refrigerant in the refrigerant radiator 33 by increasing the amount of the refrigerant discharged from the compressor 21, in the same way as in Embodiment 1. Therefore, it is possible to improve the heating performance during the heating operation, and also possible to dehumidify the vehicle interior without deteriorating the heating performance during the heating and dehumidifying operation. In addition, during the heating operation and, during the heating and dehumidifying operation, the refrigerant is sucked into the compressor 21 via the accumulator 30, and therefore it is possible to prevent the amount of the lubricating oil returned to the compressor 21 from being insufficient even if the amount of the circulating refrigerant is reduced.

Moreover, the engine radiator 43 is connected to the water circuit 40 to heat the water flowing through the water circuit 40 by using the exhaust heat from the engine. Therefore, by heating the water flowing through the water circuit 40 by using the exhaust heat from the engine, it is possible to perform the heating operation, and the first heating and dehumidifying operation. As a result, it is possible to reduce energy consumption by effectively using the exhaust heat from the engine.

Moreover, the electric heater 44 is provided to heat the water flowing through the water circuit 40. By this means, it is possible to compensate for the amount of the heating that is not sufficient to realize a desired heating performance of the heating operation and the first heating and dehumidifying operation, and therefore to maintain the vehicle interior in a desired temperature.

Here, with Embodiment 3, a configuration has been described where the amount of the heating not sufficient for the heating operation and the first heating and dehumidifying operation is compensated by using the electric heater 44 that heats the water flowing through the water circuit 40.

Figure 9:
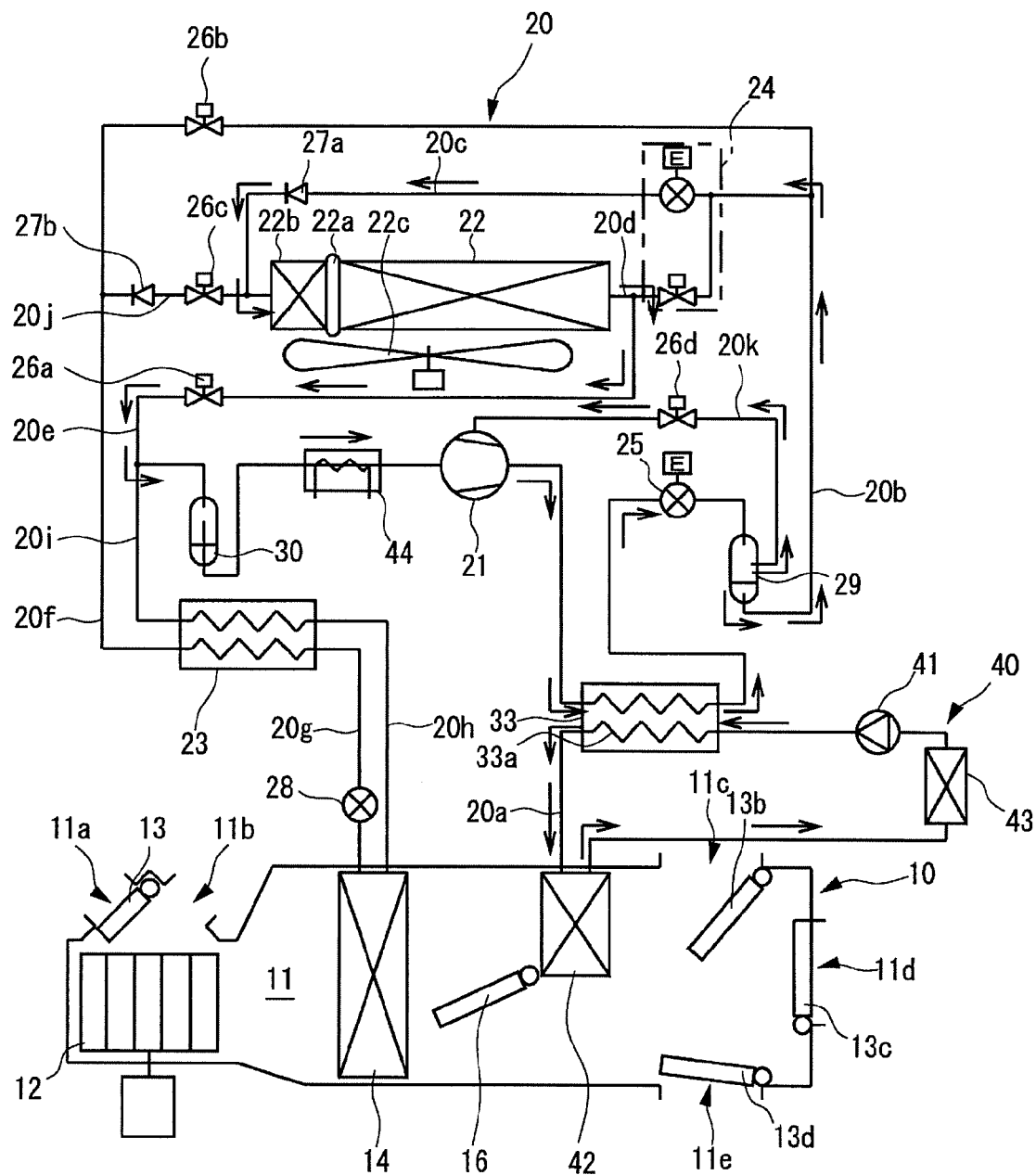
FIG. 9 is a schematic view showing the vehicle air conditioning apparatus with an electric heater provided in another position.

However, it is by no means limiting. For example, as shown in FIG. 9, another configuration is possible where the electric heater 44 is provided in the refrigerant flow passage 20f between the accumulator 30 and the compressor 21 to heat the refrigerant flowing through the refrigerant flow circuit 20. In addition, the position in which the electric heater 44 is provided in the refrigerant circuit 20 is not limited to the position between the accumulator 30 and the compressor 21. For example, the electric heater 44 may be provided in the refrigerant flow passage 20k, or may be provided in the position between the delivery side of the compressor 21 and the refrigerant radiator 33. Moreover, another configuration is possible where the electric heaters 44 are provided in the water circuit 40 and the refrigerant circuit 20, respectively, and the water flowing through the water circuit 40 and the refrigerant flowing through the refrigerant circuit 20 are heated by the respective electric heaters 44 at a time.

Moreover, although with Embodiment 3, the water circuit 40 is provided to allow the water as a heat medium to flow through, it is by no means limiting. For example, antifreeze solution consisting primarily of ethyleneglycol may be used as a heat medium.

Furthermore, with Embodiment 3, a configuration has been described where the engine radiator 43 configured to absorb the exhaust heat from the engine into the water is connected to the water circuit 40. However, it is by no means limiting. For example, the exhaust heat generated during the movement of the vehicle, such as heat discharged from an electric motor and a battery provided in the vehicle, may be absorbed into the water flowing through the water circuit 40.

Figure 10:
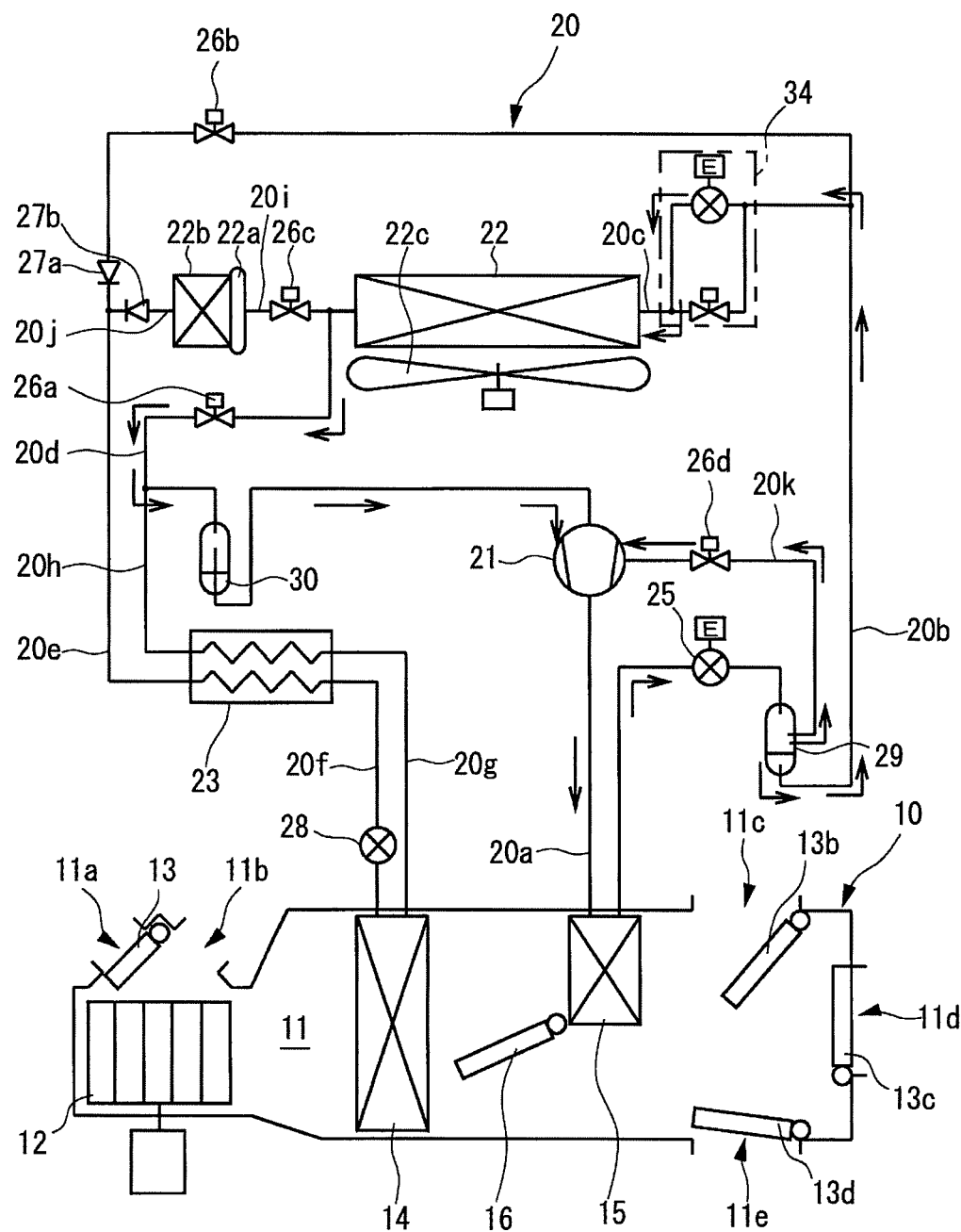
FIG. 10 is a schematic view showing the vehicle air conditioning apparatus according to Embodiment 4 of the present invention.

FIG. 10 is a schematic view showing the vehicle air conditioning apparatus according to Embodiment 4. Here, the same components are assigned the same reference numerals as in the above-described embodiments.

As shown in FIG. 10, the refrigerant circuit 20 of this vehicle air conditioning apparatus includes a control valve 34 having a refrigerant inlet and a refrigerant outlet and configured to be able to adjust the opening within two ranges, a decompression range and a condensing pressure adjusting range.

To be more specific, the refrigerant input side of the radiator 15 is connected to the refrigerant delivery side of the compressor 21, thereby to form the refrigerant flow passage 20a. Meanwhile, the refrigerant input side of the control valve 34 is connected to the refrigerant output side of the radiator 15, thereby to form the refrigerant flow passage 20b. In the refrigerant flow passage 20b, the heat released refrigerant expansion valve 25 and the gas-liquid separator 29 are provided in the order from the upstream side of the refrigerant flow direction. The refrigerant input side of the outdoor heat exchanger 22 is connected to the refrigerant output side of the control valve 34, thereby to form the refrigerant flow passage 20c. The refrigerant suction side of the compressor 21 is connected to the refrigerant output side of the outdoor heat exchanger 22, thereby to form the refrigerant flow passage 20d. In the refrigerant flow passage 20d, the first solenoid valve 26a and the accumulator 30 are provided in the order from the upstream side of the refrigerant flow direction. The high-pressure refrigerant input side of the internal heat exchanger 23 is connected to the refrigerant flow passage 20b, thereby to form the refrigerant flow passage 20e. In the refrigerant flow passage 20e, the second solenoid valve 26b and the first check valve 27a are provided in the order from the upstream side of the refrigerant flow direction. The refrigerant input side of the heat exchanger 14 is connected to the high-pressure refrigerant output side of the internal heat exchanger 23, thereby to form the refrigerant flow passage 20f. The heat exchanger expansion valve 28 is provided in the refrigerant flow passage 20f. The low-pressure refrigerant input side of the internal heat exchanger 23 is connected to the refrigerant output side of the heat exchanger 14, thereby to form the refrigerant flow passage 20g. The section of the refrigerant flow passage 20d between the first solenoid valve 26a and the accumulator 30 is connected to the low-pressure refrigerant output side of the internal heat exchanger 23, thereby to form the refrigerant flow passage 20h. The refrigerant input side of the gas-liquid separating part 22a is connected to the refrigerant output side of the outdoor heat exchanger 22 in parallel to the refrigerant flow passage 20d, thereby to form the refrigerant flow passage 20i. The third solenoid valve 26c is provided in the refrigerant flow passage 20i. The refrigerant flow passage 20e downstream from the first check valve 27a in the refrigerant flow direction is connected to the refrigerant output side of the gas-liquid separating part 20a via the supercooling part 22b, so that the refrigerant flow passage 20j is provided. The second check valve 27b is provided in the refrigerant flow passage 20j. The refrigerant suction side of the compressor 21 is connected to the gas-liquid separator 29, thereby to form the refrigerant flow passage 20k, as a bypass circuit. The fourth solenoid valve 26d is provided in the refrigerant flow passage 20k.

During the heating operation of the vehicle air conditioning apparatus having the above-described configuration, in the refrigerant circuit 20, the refrigerant flow channel of the control valve 34 is set to the expansion part; the first solenoid valve 26a is opened; the second to fourth solenoid valves 26b, 26c and 26d are closed; and the compressor 21 is operated. By this means, the refrigerant discharged from the compressor 21 flows through the refrigerant circuit 20 in the following order: the refrigerant flow passage 20a; the radiator 15; the refrigerant flow passages 20b and 20c; the outdoor heat exchanger 22; and the refrigerant flow passage 20d, and is sucked into the compressor 21. The refrigerant flowing through the refrigerant circuit 20 releases the heat in the radiator 15, and absorbs the heat in the outdoor heat exchanger 22.

In addition, during the first heating and dehumidifying operation, in the refrigerant circuit 20, the refrigerant flow channel of the control valve 24 is set to the expansion part; the first and second solenoid valves 26a and 26b are opened; the third and fourth solenoid valves 26c and 26d are closed; and the compressor 21 is operated. By this means, the refrigerant discharged from the compressor 21 flows through the refrigerant circuit 20 in the following order: the refrigerant flow passage 20a; the radiator 15; and the refrigerant flow passage 20b. Part of the refrigerant having passed through the refrigerant flow passage 20b flows through the refrigerant circuit 20 in the following order: the refrigerant flow passage 20c; the outdoor heat exchanger 22; and the refrigerant flow passage 20d, and is sucked into the compressor 21. The remaining refrigerant having passed through the refrigerant flow passage 20b flows through the refrigerant circuit 20 in the following order: the refrigerant flow passage 20e; the high-pressure side of the internal heat exchanger 23; the refrigerant flow passage 20f; the heat exchanger 14; the refrigerant flow passage 20g; the low-pressure side of the internal heat exchanger 23; and the refrigerant flow passages 20h and 20d, and is sucked into the compressor 21. The refrigerant flowing through the refrigerant circuit 20 releases the heat in the radiator 15, and absorbs the heat in the heat exchanger 14 and the outdoor heat exchanger 22.

When the fourth solenoid valve 26d is opened during the heating operation or the first heating and dehumidifying operation, the refrigerant flowing out of the radiator 15 flows into the gas-liquid separator 29, and part of the refrigerant flows through the refrigerant flow passage 20k and then flows into the section of the compressor 21 through which the refrigerant being compressed passes, in the same way as in Embodiment 1.

As described above, with the vehicle air conditioning apparatus according to the present embodiment, when the outside air temperature is low during the heating operation or the first heating and dehumidifying operation, it is possible to increase the amount of the heat released from the refrigerant in the radiator 15 by increasing the amount of the refrigerant discharged from the compressor 21, in the same way as in the above-described embodiments. Therefore, it is possible to improve the heating performance during the heating operation, and also possible to dehumidify the vehicle interior without deteriorating the heating performance during the heating and dehumidifying operation. In addition, during the heating operation, and, during the heating and dehumidifying operation, the refrigerant is sucked into the compressor 21 via the accumulator 30, and therefore it is possible to prevent the amount of the lubricating oil returned to the compressor 21 from being insufficient even if the amount of the circulating refrigerant is reduced.

Here, the refrigerant circuit 20 according to Embodiment 4 is applicable to the configuration including the water circuit 40 according to Embodiment 3.

Figure 11:
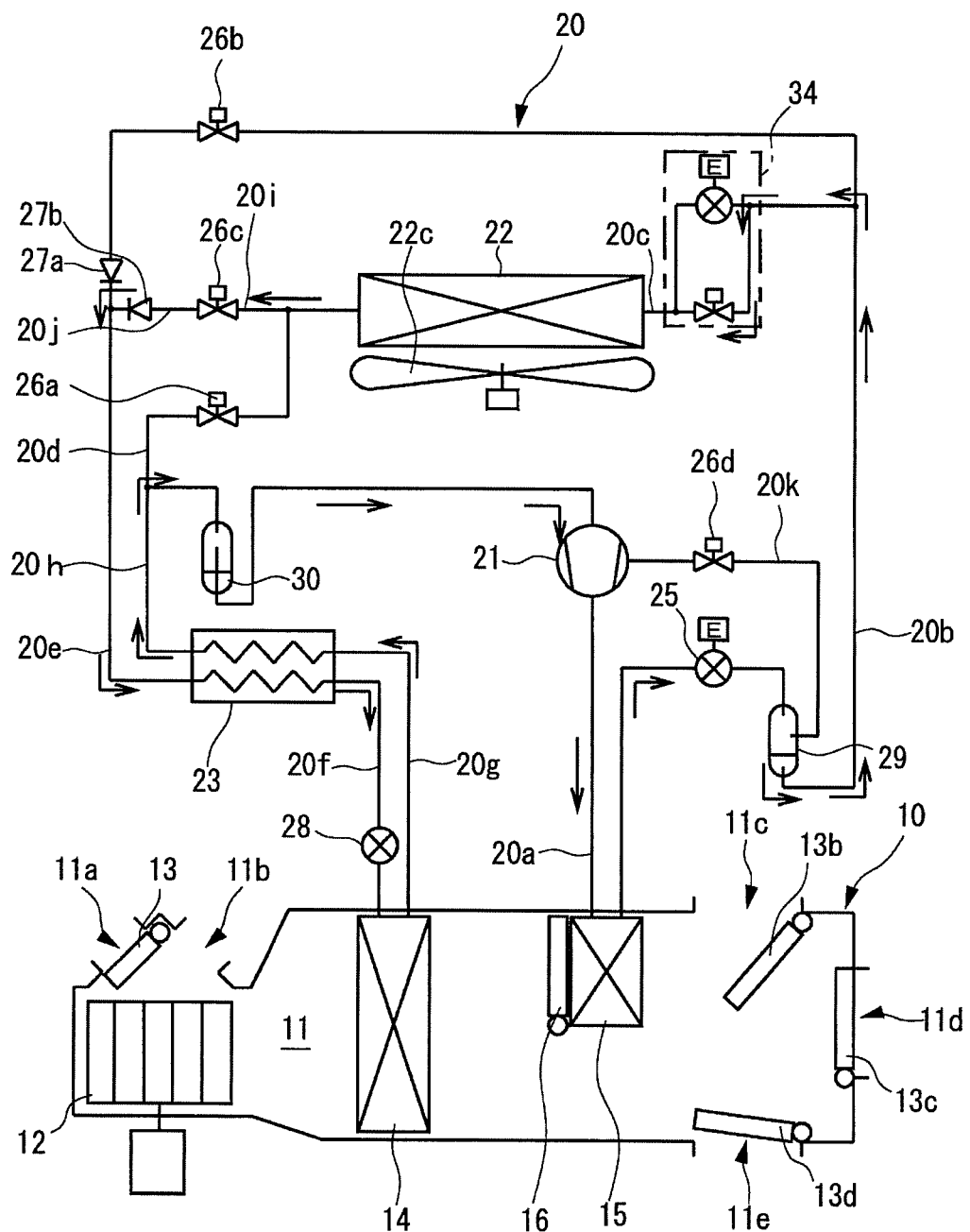
FIG. 11 is a schematic view showing the vehicle air conditioning apparatus according to Embodiment 5 of the present invention.
Figure 12:
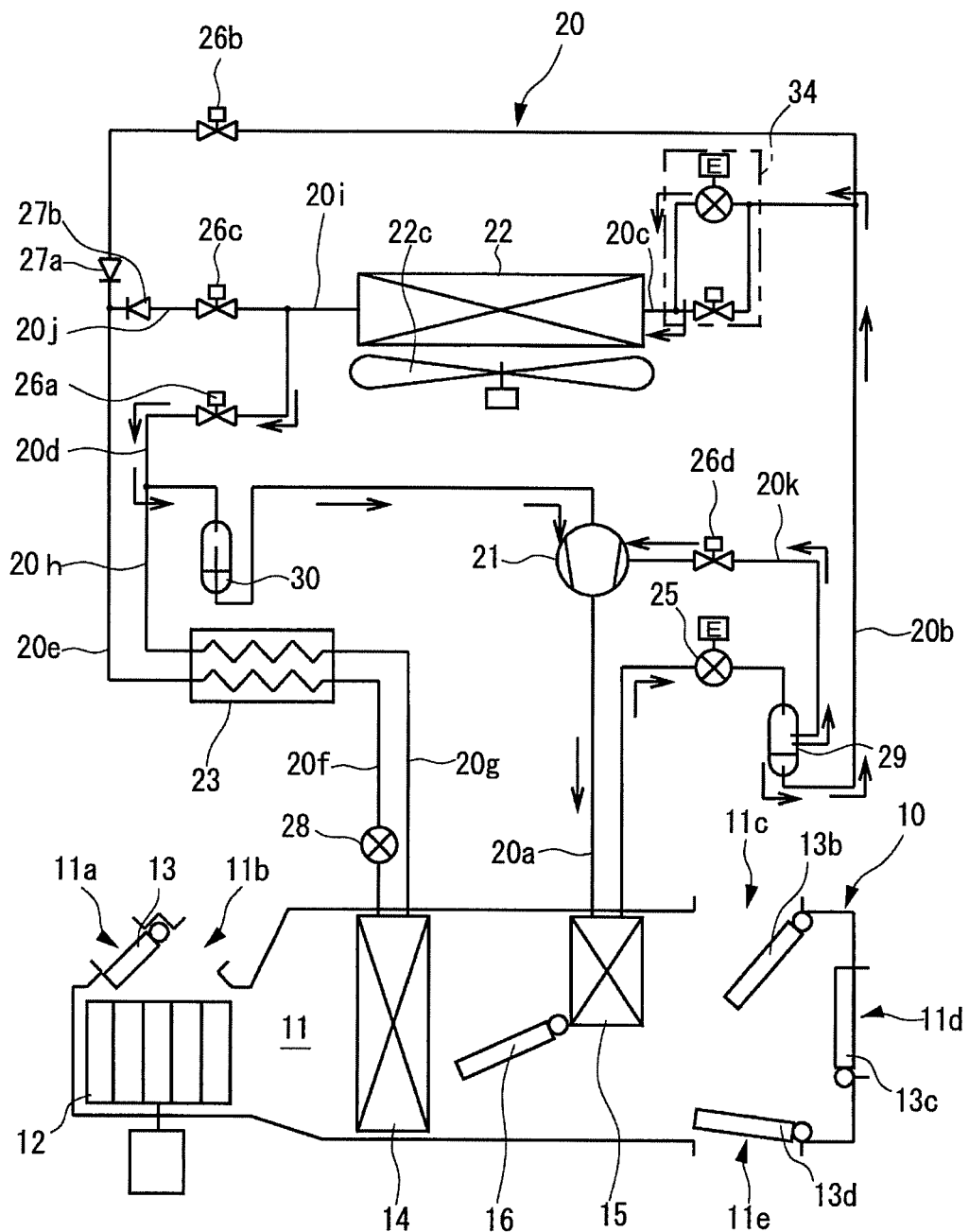
FIG. 12 is a schematic view showing the vehicle air conditioning apparatus with the fourth solenoid valve which is open during the heating operation.

FIG. 11 and FIG. 12 are schematic views each show the vehicle air conditioning apparatus according to Embodiment 5. Here, the same components are assigned the same reference numerals as in the above-described embodiments.

In the refrigerant circuit 20 of this vehicle air conditioning apparatus, the gas-liquid separator 22a and the supercooling part 22a are not provided in the same refrigerant circuit as in Embodiment 4.

During the cooling operation, and, during the cooling and dehumidifying operation of the vehicle air conditioning apparatus having the above-described configuration, in the refrigerant circuit 20, the refrigerant flow channel of the control valve 34 is set to the condensing pressure regulating part; the third solenoid valve 26c is opened; the first, second and fourth solenoid valves 26a, 26b and 26d are closed; and the compressor 21 is operated. By this means, as shown in FIG. 11, the refrigerant discharged from the compressor 21 flows through the refrigerant circuit 20 in the following order: the refrigerant flow passage 20a; the radiator 15; the refrigerant flow passages 20b and 20c; the outdoor heat exchanger 22; the refrigerant flow passages 20i and 20e; the high-pressure side of the internal heat exchanger 23; the refrigerant flow passage 20f; the heat exchanger 14; the refrigerant flow passage 20g; the low-pressure side of the internal heat exchanger 23; and the refrigerant flow passages 20h and 20d, and is sucked into the compressor 21. During the cooling operation, the refrigerant flowing through the refrigerant circuit 20 releases the heat in the outdoor heat exchanger 22, and absorbs the heat in the heat exchanger 14. Meanwhile, during the heating and dehumidifying operation, when the air mix damper 16 is opened, the refrigerant flowing through the refrigerant circuit 20 releases the heat also in the radiator 15. With the present embodiment, during the cooling operation, and, during the cooling and dehumidifying operation, a gaseous refrigerant and a liquid refrigerant flow into the accumulator 30, and therefore the liquid refrigerant is accumulated in the accumulator 30 while the gaseous refrigerant is sucked into the compressor 21.

Meanwhile, during the heating operation, and, during the first heating and dehumidifying operation, the refrigerant flows through the refrigerant circuit 20 in the same way as in Embodiment 4.

Moreover, during the heating operation or the first heating and dehumidifying operation, when the fourth solenoid valve 26d is opened, the refrigerant flowing out of the radiator 15 flows into the gas-liquid separator 29, and part of it flows through the refrigerant flow passage 20k and then flows into the section of the compressor 21 through which the refrigerant being compressed passes, as shown in FIG. 12 (showing the heating operation).

As described above, with the vehicle air conditioning apparatus according to the present embodiment, when the outside air temperature is low during the heating operation or the first heating and dehumidifying operation, it is possible to increase the amount of the heat released from the refrigerant in the radiator 15 by increasing the amount of the refrigerant discharged from the compressor 21, in the same way as in the above-described embodiments. Therefore, it is possible to improve the heating performance during the heating operation, and also possible to dehumidify the vehicle interior without deteriorating the heating performance during the heating and dehumidifying operation. Moreover, during the heating operation, and, during the heating and dehumidifying operation, the refrigerant is sucked into the compressor 21 via the accumulator 30, and therefore it is possible to prevent the amount of the lubricating oil returned to the compressor 21 from being insufficient even if the amount of the circulating refrigerant is reduced.

Here, with the present embodiments, a configuration has been described where the control valve 24, 34 having the expansion part configured to decompress the refrigerant flowing into the outdoor heat exchanger 22 during the heating operation and during the first heating and dehumidifying operation, and the condensing pressure regulating part configured to control the condensing pressure of the refrigerant in the radiator 15 during the cooling and dehumidifying operation. However, it is by no means limiting. For example, the expansion part and the condensing pressure regulating part each having the adjustable opening are individually provided in the refrigerant circuit 20, instead of the control valve 24, 34.

Moreover, with the present embodiment, a configuration has been described where the refrigerant flow passage 20k is connected to the refrigerant inlet that communicates with the section of the compressor 21 through which the refrigerant being compressed passes. However, it is by no means limiting. For example, when the compressor 21 is a two-stage compressor, the refrigerant flow passage 20k may be connected to the refrigerant flow passage between the first and second stages of the compressor 21.

REFERENCE SIGNS LIST 10 air conditioning unit, 14 heat exchanger, 15 radiator, 20 refrigerant circuit, 20k refrigerant flow passage, 21 compressor, 22 outdoor heat exchanger, 24 control valve, 25 heat released refrigerant expansion valve, 26a, 26b, 26c, and 26d first to fourth solenoid valve, 28 heat exchanger expansion valve, 34 control valve, 40 water circuit, 41 water pump, 42 heater core, 43 engine radiator, 44 electric heater

The invention claimed is:

1. A vehicle air conditioning apparatus comprising:
a compressor configured to compress and discharge a refrigerant;
a radiator configured to release heat from the refrigerant;
a heat exchanger configured to absorb the heat into the refrigerant;
an outdoor heat exchanger configured to release the heat from or absorb the heat into the refrigerant;
a first expansion valve configured to decompress the refrigerant flowing into the outdoor heat exchanger;
a second expansion valve configured to decompress the refrigerant flowing into the heat exchanger;
an accumulator configured to separate the refrigerant into a gas and a liquid and to allow the refrigerant to be sucked into the compressor, the accumulator being provided in a refrigerant flow passage to a suction side of the compressor into which the refrigerant is sucked;
a heating refrigerant circuit configured to allow the refrigerant discharged from the compressor to flow into the radiator and release heat in the radiator, to allow the refrigerant having passed through the radiator to flow into the outdoor heat exchanger via the first expansion valve and absorb the heat in the outdoor heat exchanger, and to allow the refrigerant having passed through the outdoor heat exchanger to be sucked into the compressor via the accumulator;
a heating and dehumidifying refrigerant circuit configured to allow the refrigerant discharged from the compressor to flow into the radiator and release the heat in the radiator, to allow part of the refrigerant having passed through the radiator to flow into the outdoor heat exchanger via the first expansion valve and absorb the heat in the outdoor heat exchanger, to allow a remaining refrigerant having passed through the radiator to flow into the heat exchanger via the second expansion valve and absorb the heat in the heat exchanger, and to allow the refrigerant having passed through the outdoor heat exchanger and the heat exchanger to be sucked into the compressor via the accumulator;
a third expansion valve configured to decompress the refrigerant flowing out of the radiator in the heating refrigerant circuit and the heating and dehumidifying refrigerant circuit;
a gas-liquid separator configured to separate the refrigerant decompressed by the third expansion valve into a gaseous refrigerant and a liquid refrigerant;
a bypass circuit configured to allow part of at least the gaseous refrigerant separated in the gas-liquid separator to flow into a section of the compressor through which the refrigerant being compressed passes; and
a valve opening control device configured to control opening of the third expansion valve such that the degree of supercooling of the refrigerant in the radiator is a predetermined value, and to control opening of the first expansion valve such that the amount of the refrigerant flowing through the bypass circuit is a predetermined value.

2. The vehicle air conditioning apparatus according to claim 1, further comprising:
a fourth expansion valve configured to decompress the refrigerant flowing through the bypass circuit; and
the valve opening control device further configured to control opening of the fourth expansion valve such that the amount of the refrigerant flowing through the bypass circuit is a predetermined value.

3. The vehicle air conditioning apparatus according to claim 1, further comprising:
a heat medium pump configured to discharge a heat medium;
a heat exchange part provided in the radiator and configured to perform a heat exchange between the refrigerant flowing through the radiator and the heat medium;
a heat medium radiator configured to release heat from the heat medium; and
a heat medium circuit configured to allow the heat medium discharged from the heat medium pump to flow into the heat exchange part and absorb the heat in the heat exchange part, to allow the heat medium having passed through the heat exchange part to flow into the heat medium radiator and release the heat in the heat medium radiator, and to allow the heat medium having passed through the heat medium radiator to be sucked into the heat medium pump.

4. The vehicle air conditioning apparatus according to claim 3, further comprising a heat medium heating device configured to heat the heat medium flowing through the heat medium circuit.

5. The vehicle air conditioning apparatus according to claim 4, wherein the heat medium heating device includes an electric heater configured to be able to heat the heat medium flowing through the heat medium circuit.

6. The vehicle air conditioning apparatus according to claim 4, wherein the heat medium heating device includes an exhaust heat absorbing part configured to allow the heat medium flowing through the heat medium circuit to absorb the heat released from another component, the heat medium heating device being provided in the heat medium circuit.

7. The vehicle air conditioning apparatus according to claim 1, further comprising a refrigerant heating device configured to heat the refrigerant flowing through the heating refrigerant circuit and the heating and dehumidifying refrigerant circuit.

* * * * *